US012610023B2

(12) United States Patent
Matsugami

(10) Patent No.: US 12,610,023 B2
(45) Date of Patent: Apr. 21, 2026

(54) TRANSMISSION SYSTEM AND TRANSMISSION DEVICE

(71) Applicant: LAPIS Technology Co., Ltd., Yokohama (JP)

(72) Inventor: Toshiki Matsugami, Yokohama (JP)

(73) Assignee: LAPIS TECHNOLOGY CO., LTD., Yokohama (JP)

( * ) Notice: Subject to any disclaimer, the term of this patent is extended or adjusted under 35 U.S.C. 154(b) by 0 days.

(21) Appl. No.: 18/614,020

(22) Filed: Mar. 22, 2024

(65) Prior Publication Data

US 2024/0333871 A1     Oct. 3, 2024

(30) Foreign Application Priority Data

Mar. 29, 2023     (JP) ................................. 2023-054256

(51) Int. Cl.
*H04N 7/087*        (2006.01)
*H04N 5/04*         (2006.01)
*H04N 7/12*         (2006.01)
(52) U.S. Cl.
CPC ............... *H04N 7/087* (2013.01); *H04N 5/04* (2013.01); *H04N 7/12* (2013.01)
(58) Field of Classification Search
CPC ............. H04N 7/087; H04N 5/04; H04N 7/12
USPC ....................................................... 348/478
See application file for complete search history.

(56) References Cited

U.S. PATENT DOCUMENTS

| | | | | |
|---|---|---|---|---|
| 7,999,840 B2 * | 8/2011 | Kim | ....................... | H04N 7/148 |
| | | | | 348/14.02 |
| 8,902,368 B2 * | 12/2014 | Nio | .................. | H04N 21/25825 |
| | | | | 710/48 |
| 9,525,895 B2 * | 12/2016 | Tsukagoshi | ........ | H04N 21/4621 |
| 11,212,563 B2 * | 12/2021 | Xiong | .................. | H04N 21/234 |
| 11,962,482 B2 * | 4/2024 | Kölhi | .................... | H04L 65/403 |

FOREIGN PATENT DOCUMENTS

JP          2017-216533 A     12/2017

* cited by examiner

*Primary Examiner* — Trang U Tran
(74) *Attorney, Agent, or Firm* — Rabin & Berdo, P.C.

(57)            ABSTRACT

A transmission system including a transmission device capable of transmitting a video signal, and a reception device capable of receiving the video signal transmitted by the transmission device, the transmission system includes: a processor connected to a memory; a video transmission circuit and a video reception circuit that transmit the video signal between the transmission device and the reception device; a transmission-side data transceiving circuit and a reception-side data transceiving circuit that transmit a data signal between the transmission device and the reception device, wherein the processor is configured to selectively execute a video signal transmission mode in which transmission of the video signal is performed and transmission of the data signal superimposed on the video signal is performed, and a data signal transmission exclusive mode in which transmission of the video signal is stopped and transmission of the data signal is performed.

2 Claims, 4 Drawing Sheets

F I G. 1
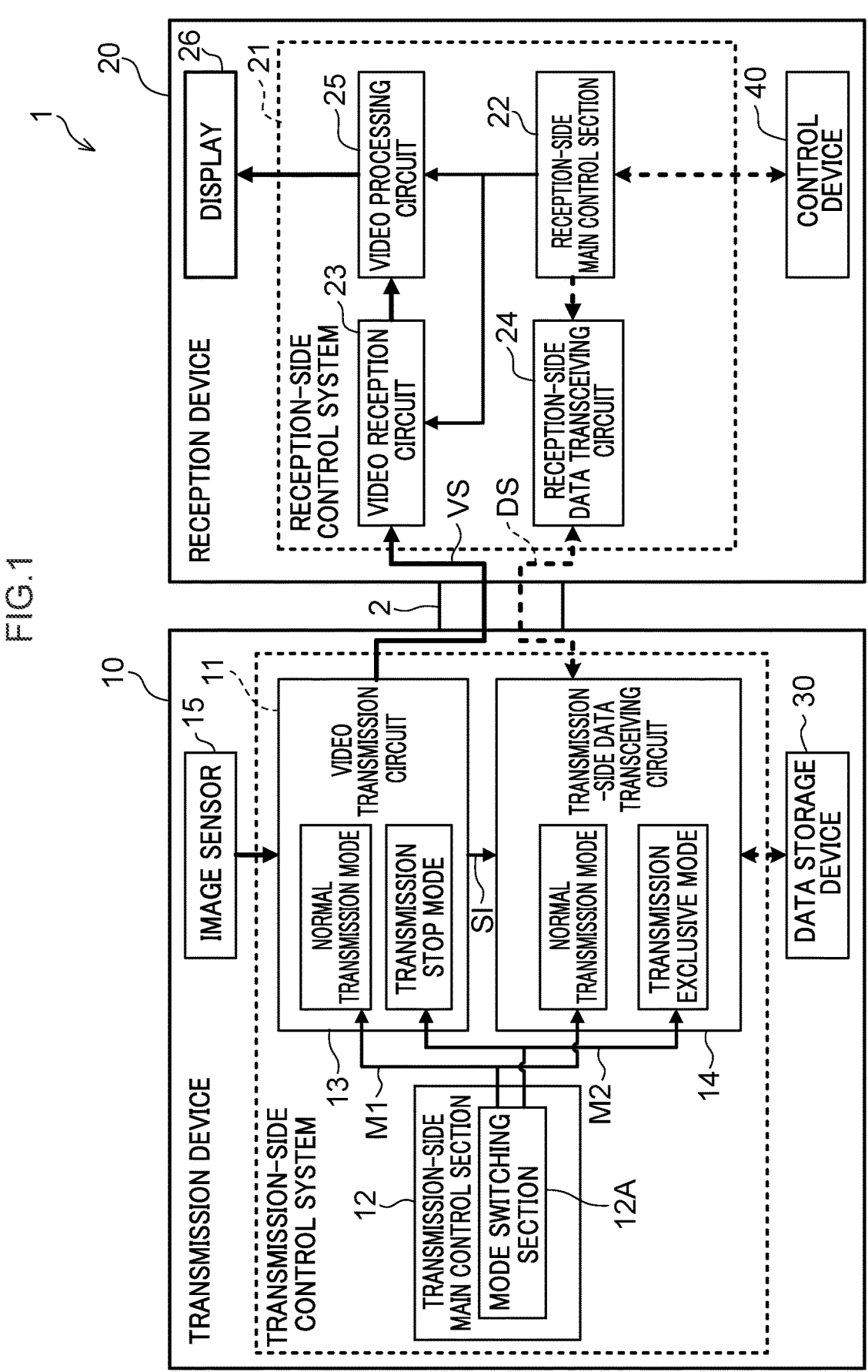

FIG.4

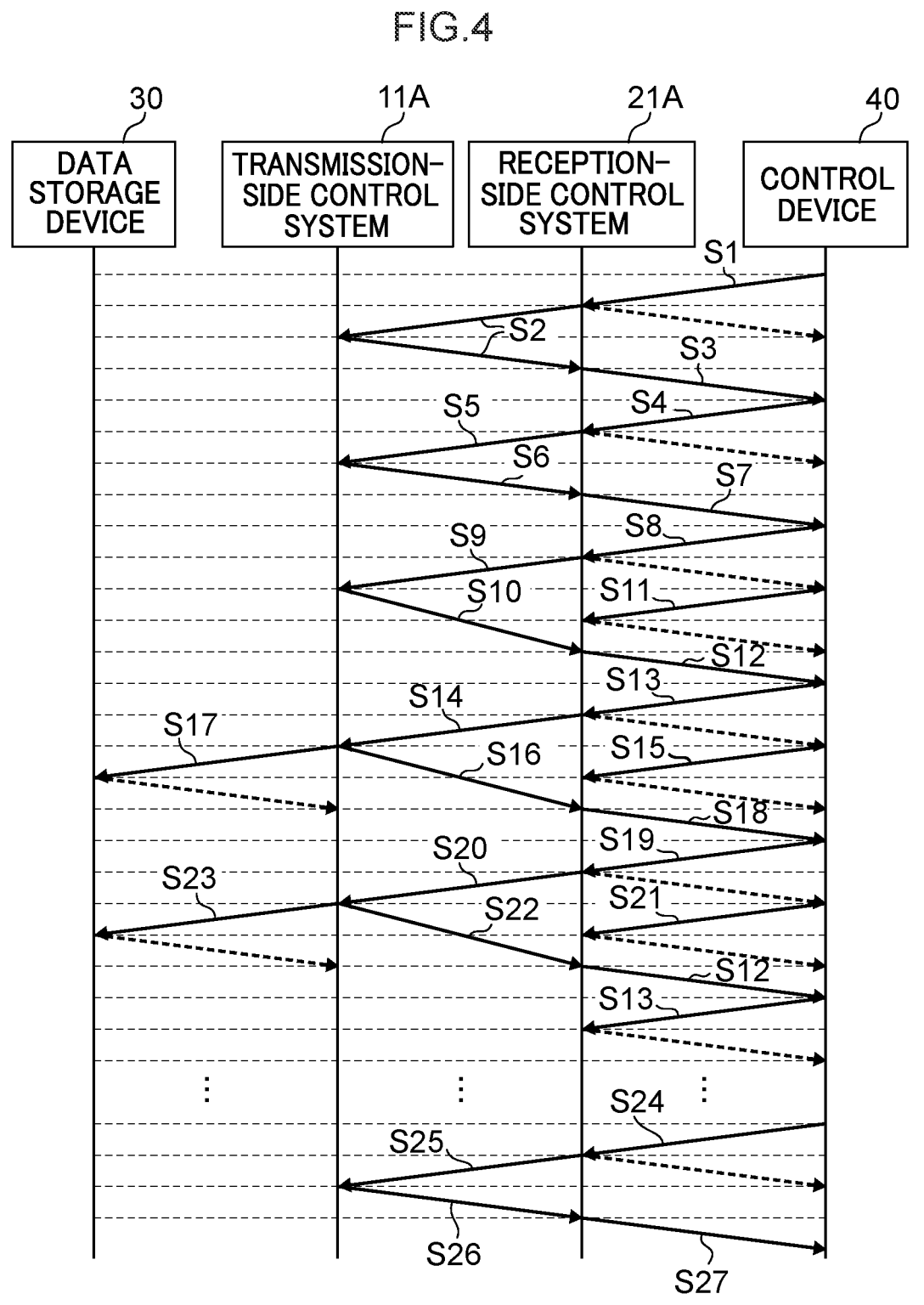

| 30 | 11A | 21A | 40 |
|---|---|---|---|
| DATA STORAGE DEVICE | TRANSMISSION-SIDE CONTROL SYSTEM | RECEPTION-SIDE CONTROL SYSTEM | CONTROL DEVICE |

S1

S2

S3

S5          S4

S6

S7

S9          S8

S10          S11

S12

S13

S14

S17          S16          S15

S18

S20          S19

S23          S22          S21

S12

S13

S24

S25

S26          S27

TRANSMISSION SYSTEM AND TRANSMISSION DEVICE

CROSS-REFERENCE TO RELATED APPLICATION

This application is based on and claims priority under 35 USC 119 from Japanese Patent Application No. 2023-054256 filed on Mar. 29, 2023, the disclosure of which is incorporated by reference herein.

BACKGROUND

Technical Field

The present disclosure relates to a transmission system and a transmission device.

Related Art

In a transmission system that executes transceiving between two devices mainly of a video signal, sometimes transceiving of a data signal other than video signal (hereafter referred to simply as "data signal") is executed in parallel to the video signal (for example, see Japanese Patent Application Laid-Open (JP-A) No. 2017-216533). Such a transmission system is applicable to a system including a camera and a display device such as, for example, a vehicle surroundings monitoring system and drive recorder, or a car navigation system.

Japanese Patent Application Laid-Open (JP-A) No. 2017-216533 describes a video transmission system that multiplexes (superimposes) a data signal onto a blanking region of a video signal. In this video transmission system, multiplexing processing and decoding processing are executed on data based on a priority ranking of the data signal.

In cases in which, as in JP-A No. 2017-216533, transmission of the data signal is performed using the blanking region of a video signal, and specifically of an analogue video signal, the transmittable data volume per unit time depends on the length of the blanking region. This means that when the transmission system is a vehicle surroundings monitoring system or the like, one device, for example a camera, is requested to execute various controls, execution of updating, rewriting, and the like of firmware from the other device side, for example a control device side. When the various camera controls, for example adjustment to brightness and the like, have comparatively small data volumes, these transmissions can be handled using the blanking region without problem. On the other hand, sometimes there are cases in which the data needed for one cycle of processing, such as updating or rewriting of firmware, is a large volume of data of the order of 100 Kbytes, for example. Data transmission takes a lot of time when data transmission for such a large volume of data is performed using the above blanking region alone (hereafter referred to as "video blanking period"). There are accordingly demands to shorten the time taken for transmission of a large volume of data because execution of other processing is limited while the large volume data is being transmitted.

SUMMARY

A transmission system of the present disclosure includes a transmission device capable of transmitting a video signal, and a reception device capable of receiving the video signal transmitted by the transmission device, a video signal transmission means that transmits the video signal between the transmission device and the reception device, a data signal transmission means that transmits a data signal that is different from the video signal between the transmission device and the reception device, and a transmission mode switching means that selectively executes a video signal transmission mode in which transmission of the video signal is performed and transmission of the data signal superimposed on the video signal is performed, and a data signal transmission exclusive mode in which transmission of the video signal is stopped and transmission of the data signal is performed.

A transmission device of the present disclosure is capable of transmitting a video signal and a data signal different to the video signal, and includes a transmission mode switching means that selectively executes a video signal transmission mode in which transmission of the video signal is performed and transmission of the data signal superimposed on the video signal is performed, and a data signal transmission exclusive mode in which transmission of the video signal is stopped and transmission of the data signal is performed.

BRIEF DESCRIPTION OF THE DRAWINGS

Exemplary embodiments of the present disclosure will be described in detail based on the following figures, wherein:

FIG. 1 is a schematic explanatory diagram illustrating an example of a transmission system according to an exemplary embodiment of the present disclosure;

FIG. 4 is a sequence chart illustrating an example of a case in which transmission of firmware update data is executed in the transmission system illustrated in FIG. 3.

DETAILED DESCRIPTION

Figure 2A:
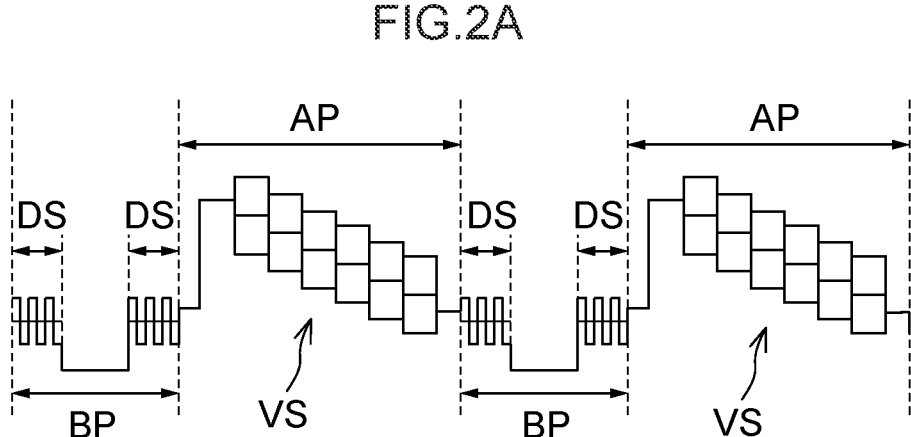
FIG. 2A and FIG. 2B are diagrams illustrating examples of signals transmitted in each transmission mode executed by the transmission system illustrated in FIG. 1.

The present disclosure enables provision of a transmission system and a transmission device that are capable of shortening the time needed for large volume data transmission.

Explanation follows regarding each exemplary embodiment for implementing the present disclosure, with reference to the drawings. Note that the following explanation schematically indicates a scope for achieving an object of the present disclosure, and description will mainly be of a range to describe these portions of the present disclosure, with known technology employed for areas not covered by the description. Moreover, the same or related reference numerals are appended to the same or equivalent members across the drawings, with duplicate explanation omitted thereof. Furthermore, in cases in which there are plural individual instances of the same or equivalent members in the drawings, for ease of explanation reference numerals are sometimes only appended to some out of these instances.

FIG. 1 is a schematic explanatory diagram illustrating an example of a transmission system according to an exemplary embodiment of the present disclosure. A transmission system 1 according to the present exemplary embodiment is a system that is capable of performing transmission of a video signal between devices and, for example, may be a system configuring an onboard car navigation system. The transmission system 1 includes a transmission device 10 and a reception device 20, as illustrated in FIG. 1. The transmission device 10 and the reception device 20 may be connected together by a transmission cable 2 so as to enable communication therebetween. Note that communication between the transmission device 10 and the reception device 20 may be implemented by wireless communication instead of using the transmission cable 2. Moreover, in order to facilitate understanding of the path of each signal, in FIG. 1 an arrow indicating a transmission path of an analogue video signal VS is indicated by a bold solid line, and an arrow indicating a transceiving path of a data signal DS is indicated by a bold dotted line.

The transmission device 10 may, for example, be a camera module. This transmission device 10 may include an image sensor 15, and may be a device capable of transmitting a video signal, for example an analogue video signal VS configuring video images captured by the image sensor 15, to the reception device 20.

The image sensor 15 may, for example, include an image pick-up device such as a charge coupled device (CCD) sensor or a complementary metal oxide semiconductor (CMOS) sensor.

Moreover, the transmission device 10 includes an internal transmission-side control system 11 that performs various control within the transmission device 10. The transmission-side control system 11 may include a transmission-side main control section 12, a video transmission circuit 13 serving as an example of a video signal transmission means, and a transmission-side data transceiving circuit 14 serving as an example of a data signal transmission means.

The transmission-side main control section 12 is at least capable of performing control related to signal transmission between the transmission device 10 and the reception device 20, and may be implemented by a processor or the like. In addition, the transmission-side main control section 12 may be capable of controlling imaging operation by the image sensor 15. The transmission-side main control section 12 may include a mode switching section 12A capable of switching a mode of transmission for various signals between the transmission device 10 and the reception device 20. This means that the transmission-side main control section 12 according to the present exemplary corresponds to an example of a transmission mode switching means. The transmission-side main control section 12 may be implemented by a processor such as, for example, an image signal processor (ISP).

Transmission modes executable by the transmission device 10 include a video signal transmission mode M1 in which transmission is performed of the analogue video signal VS and transmission is performed of a data signal DS superimposed on the analogue video signal VS, and a data signal transmission exclusive mode M2 in which transmission of the analogue video signal VS is stopped and transmission of the data signal DS is performed. The transmission-side main control section 12 is able selectively switch between execution of one or other out of the video signal transmission mode M1 and the data signal transmission exclusive mode M2.

The video transmission circuit 13 may be a circuit to transmit video images captured by the image sensor 15 to the reception device 20 via the transmission cable 2. Moreover, the transmission-side data transceiving circuit 14 is a circuit that, in coordination with a reception-side data transceiving circuit 24, described later, transceives the data signal DS and, for example, various camera control signals and data for updating or rewriting firmware in a data storage device 30, described later, with the reception device 20 through the transmission cable 2. The video transmission circuit 13 and the transmission-side data transceiving circuit 14 may be set to execute action modes that are switched based on a control signal from the transmission-side main control section 12. Note that details regarding these action modes are described later.

The transmission system 1 according to the present exemplary embodiment may further include the data storage device 30 capable of storing data such as data needed to control the transmission device 10 and the analogue video signal VS generated by the transmission device 10 and the like. The data storage device 30 is connected to the transmission device 10 so as to be capable of communicating therewith, and may be configured by external storage, as exemplified by flash memory or the like. The data storage device 30 may be connected to the transmission-side data transceiving circuit 14 through a serial bus such as, for example, an inter-integrated circuit (I2C). The data storage device 30 may be a device installed with internal firmware.

The reception device 20 may, for example, be a navigation device including a display 26. The reception device 20 may be a device capable of converting the analogue video signal VS transmitted from the transmission device 10 into images displayable on the display 26 and display them thereon. Moreover, the transmission system 1 according to the present exemplary embodiment may furthermore include a control device 40 connected to the reception device 20 so as to be able to communicate therewith.

The display 26 may be configured by a known display means, such as a liquid crystal display (LCD) or an organic electroluminescence display (OELD). Images that have been captured by the transmission device 10, for example, surrounding images of a vehicle installed with the transmission system 1, may be displayed on the display 26.

Moreover, the reception device 20 includes an internal reception-side control system 21 that performs various controls within the reception device 20. The reception-side control system 21 may include a reception-side main control section 22, a video reception circuit 23 serving as an example of a video signal transmission means, a reception-side data transceiving circuit 24 serving as an example of a data signal transmission means, and a video processing circuit 25.

The reception-side main control section 22 is a control means that, for example, performs overall control of the transmission system 1, and may be implemented by a processor or the like. More specifically, the reception-side main control section 22 may be capable of transmitting control signals to various circuits in the reception-side control system 21. The reception-side main control section 22 may, for example, be connected to the control device 40 through a serial bus.

The control device 40 may, for example, be mainly configured by a micro controller unit (MCU) processor. The control device 40 may be configured so as to be capable of transmitting information such as camera module control information or information related to updating or rewriting firmware to the reception-side main control section 22 in a serial communication data format such as, for example, I2C or serial peripheral interface (SPI).

The video reception circuit 23 is a circuit that receives the analogue video signal VS transmitted from the video transmission circuit 13 via the transmission cable 2. Based on the analogue video signal VS received by the video reception circuit 23, the video processing circuit 25 generates captured images displayable on the display 26. Moreover, the reception-side data transceiving circuit 24 is a circuit that, in coordination with the transmission-side data transceiving circuit 14, transceives the data signal DS with the transmission device 10.

The transmission system 1 configured as described above adopts two transmission modes in order to shorten a transmission time in cases in which there is a need for large volume data transmission, such as for updating firmware in the data storage device 30. Description follows regarding the two transmission modes executed by the transmission system 1 according to the present exemplary embodiment.

Figure 2B:
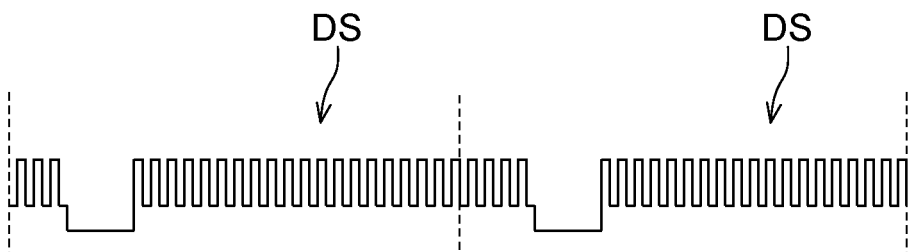

FIG. 2A and FIG. 2B are diagrams illustrating examples of signals transmitted in each transmission mode executed by the transmission system illustrated in FIG. 1. FIG. 2A illustrates two frames' worth of signal out of a signal transmitted in the video signal transmission mode, and FIG. 2B illustrates two frames' worth of signal out of a signal transmitted in a data signal transmission exclusive mode. In the present exemplary embodiment, switching between transmission modes is executed based on signals from the mode switching section 12A in the transmission-side main control section 12. Note that the timing at which mode switching is executed may be decided based on information and the like from other configuration elements configuring the transmission system 1, and specifically from the control device 40.

In cases in which the video signal transmission mode M1 has been selected by the mode switching section 12A, the corresponding action mode is selected and executed in the video transmission circuit 13 and the transmission-side data transceiving circuit 14 that have received control signals from the mode switching section 12A. Specifically, on receipt of a control signal to select the video signal transmission mode M1 from the mode switching section 12A, the video transmission circuit 13 is actuated in a normal transmission mode, and executes transmission of the analogue video signal VS. Similarly, on receipt of a control signal to select the video signal transmission mode M1 from the mode switching section 12A, the transmission-side data transceiving circuit 14 is actuated in the normal transmission mode, and executes transmission of the data signal DS by superimposing the data signal DS on the analogue video signal VS.

When the video transmission circuit 13 and the transmission-side data transceiving circuit 14 have been actuated as described above, transmission signals between the transmission device 10 and the reception device 20 are configured as illustrated in FIG. 2A. Namely, in a single frame, the analogue video signal VS is transmitted in the active period AP and transceiving of the data signal DS is performed in a video blanking period (for example vertical blanking period) BP when the analogue video signal VS is not being transmitted. Note that the data signal DS transmitted in the video signal transmission mode M1 is assumed to be mainly data transmission of about a few commands, such as to adjust brightness of the camera serving as the transmission device 10.

On the other hand, when the data signal transmission exclusive mode M2 has been selected by the mode switching section 12A, similarly to as described above, on receipt of control signals from the mode switching section 12A, the video transmission circuit 13 and the transmission-side data transceiving circuit 14 select and execute corresponding action modes. More specifically, on receipt of a control signal to select the data signal transmission exclusive mode M2 from the mode switching section 12A, the video transmission circuit 13 is actuated in a transmission stop mode, and stops transmission of the analogue video signal VS.

Similarly, on receipt of a control signal to select the data signal transmission exclusive mode M2 from the mode switching section 12A, the transmission-side data transceiving circuit 14 is actuated in a transmission exclusive mode and executes transmission of the data signal DS continuously across an entire period.

When the video transmission circuit 13 and the transmission-side data transceiving circuit 14 have been actuated as described above, the transmission signal between the transmission device 10 and the reception device 20 is configured as illustrated in FIG. 2B. Namely, only transceiving of the data signal DS is performed across the entire period of a single frame.

During execution of the data signal transmission exclusive mode M2 described above, transmission of the analogue video signal VS is stopped, and so the data signal transmission exclusive mode M2 may be executed only when there is a need for large volume data transmission, such as cases in which data to update firmware in the data storage device 30 is acquired from the control device 40. This means that switching to the data signal transmission exclusive mode M2 may be executed temporarily based on information and the like from the reception device 20.

The transmission system 1 and the transmission device 10 according to the present exemplary embodiment are able, by adopting the data signal transmission exclusive mode M2 described above, to complete data transmission speedily by temporarily stopping the analogue video signal VS when there is a need for large volume data transmission. This means that the time needed for large volume data transmission can be shortened, and the effect thereof on other processing of the transmission system 1 can be suppressed.

In addition thereto, the data signal transmission exclusive mode M2 may be switched to the video signal transmission mode M1 quickly when the necessary data transmission has been completed. In order to execute switching smoothly between the two modes described above, a synchronization signal informing the reception device 20 of a timing to read the analogue video signal VS may be transmitted from the transmission device 10 to the reception device 20 during the data signal transmission exclusive mode M2. Such a synchronization signal may, for example, be generated in the transmission-side data transceiving circuit 14 by transmitting synchronization information SI from the video transmission circuit 13 to the transmission-side data transceiving circuit 14. When the mode has been returned from the data signal transmission exclusive mode M2 to the video signal transmission mode M1 by performing transmission of the synchronization signal during data signal transmission exclusive mode M2 in this manner, the processing in the video processing circuit 25 can be executed smoothly, and display on the display can be resumed quickly.

The transmission system 1 and the transmission device 10 of the present disclosure are not limited to the exemplary embodiment described above, and appropriate modifications are implementable within a range able to maintain the functions thereof. Description follows regarding modified examples of the above exemplary embodiment.

Figure 3:
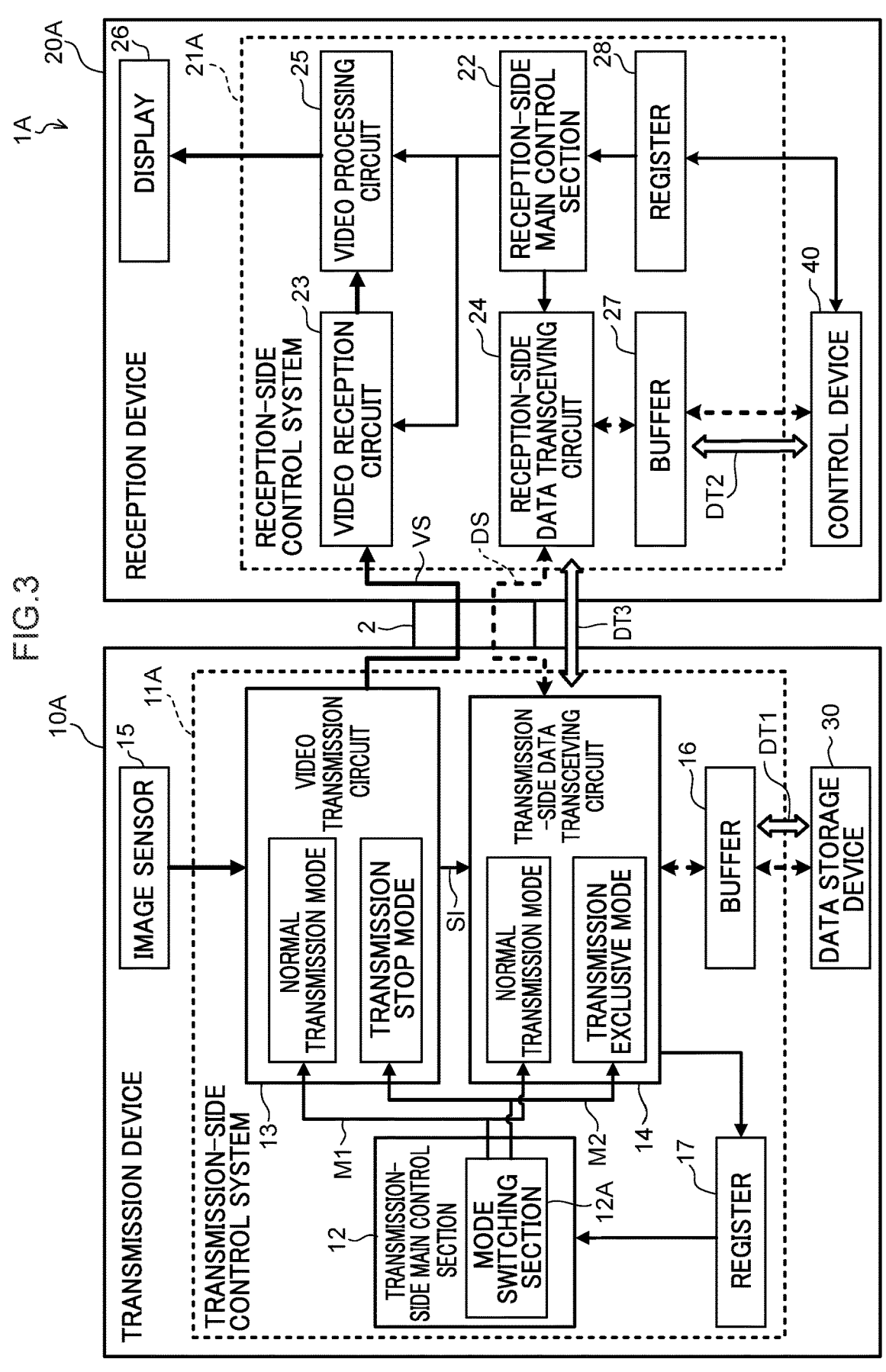
FIG. 3 is a schematic explanatory diagram illustrating a modified example of the transmission system illustrated in FIG. 1.

FIG. 3 is a schematic explanatory diagram illustrating a modified example of the transmission system illustrated in FIG. 1. A transmission system 1A according to the present modified example differs from the transmission system 1 of the exemplary embodiment described above only in the addition of configuration to further improve the efficiency of transmission of the data signal DS, as illustrated in FIG. 3. Description follows centered on the configuration parts of the transmission system 1A according to the present modified example that differ from the transmission system 1 according to the first exemplary embodiment, the same reference numerals will be appended to configuration similar to that of the transmission system 1 according to the first exemplary embodiment, and explanation thereof will be omitted.

In the transmission system 1A according to the present modified example, as illustrated in FIG. 3, a transmission-side control system 11A in a transmission device 10A may further include a transmission-side buffer 16 and a transmission-side register 17 capable of temporarily storing at least a data signal received by the transmission-side data transceiving circuit 14.

The transmission-side buffer 16 may be a storage area for temporarily storing data utilized in the data storage device 30 from out of the data signal received by the transmission-side data transceiving circuit 14. The transmission-side buffer 16 may be implemented by plural (for example 2) non-illustrated memories. The transmission-side buffer 16 may divide the storage area into plural, for example two, respective divisions, one for each memory, and these two divided storage areas are respectively called a first transmission-side buffer and a second transmission-side buffer below. Data temporarily stored in the transmission-side buffer 16 may, for example, be update data for firmware of the data storage device 30.

The transmission-side register 17 may be a storage area for temporarily storing data to be referenced by the transmission-side main control section 12 from out of the data signal received by the transmission-side data transceiving circuit 14. The transmission-side register 17 may, for example, be implemented using part of a processor configuring the transmission-side main control section 12. An example of data temporarily stored in the transmission-side register 17 is information related to mode switching.

A reception-side control system 21A in a reception device 20A of the transmission system 1A according to the present modified example may further include a reception-side buffer 27 and a reception-side register 28 that are capable of temporarily storing at least a data signal transmitted from the control device 40.

The reception-side buffer 27 may be a storage area for temporarily storing the data signal DS transmitted from the control device 40. The reception-side buffer 27 may be implemented by plural (for example two) non-illustrated memories. Moreover, the reception-side buffer 27 may divide the storage area into plural, for example two, respective divisions, one for each memory, and these two divided storage areas are respectively called a first reception-side buffer and a second reception-side buffer below.

The reception-side register 28 may be a storage area for temporarily storing various control signals transmitted from the control device 40 to the reception-side main control section 22. The reception-side register 28 may, for example, be implemented by using part of a processor configuring the reception-side main control section 22.

Utilizing the transmission-side buffer 16 and the reception-side buffer 27, as in the configuration adopted in the transmission system 1A according to the present modified example, enables parallel execution of transmission of a data signal between the data storage device 30 and the transmission device 10A (more specifically the transmission-side control system 11A) (hereafter referred to as "first data transmission") DT1, transmission of a data signal between the control device 40 and the reception device 20A (more specifically the reception-side control system 21A) (hereafter referred to as "second data transmission") DT2, and transmission of a data signal between the transmission device 10A and the reception device 20A (hereafter referred to as "third data transmission") DT3. In order to explain this point in more detail, description follows regarding an example of a protocol for a case in which updating of firmware of the data storage device 30 in the transmission system 1A is executed as an example of a cycle of processes when performing data transmission.

FIG. 4 is a sequence chart illustrating an example of a case in which transmission of firmware update data is executed in the transmission system illustrated in FIG. 3. A cycle of processes for data transmission are executed when the control device 40 acquires firmware update information for the data storage device 30 while the transmission system 1A is executing normal actuation, namely during actuation in the video signal transmission mode M1. More specifically first, as illustrated in FIG. 4, the control device 40 transmits a request to the reception-side control system 21A to write to the data storage device 30 (process S1). The reception-side control system 21A that has received the request to write to the data storage device 30 confirms whether or not the transmission-side control system 11A is able to perform a writing action based on the request (process S2), and also replies with a receipt notification to the control device 40 (see the dotted line arrow in FIG. 4, similar applies below).

When confirmed that the writing action is able to be performed by the transmission-side control system 11A of the reception-side control system 21A, the reception-side control system 21A notifies the control device 40 thereof (process S3). On receipt of this notification, next the control device 40 transmits a control signal to switch to the data signal transmission exclusive mode M2 to the reception-side control system 21A (process S4). The reception-side control system 21A transmits this control signal to the transmission-side control system 11A (process S5) and also replies with a receipt notification to the control device 40.

On receipt of the control signal to switch to the data signal transmission exclusive mode M2 from the reception-side control system 21A, the transmission-side control system 11A transmits this control signal to the transmission-side main control section 12 via the transmission-side register 17, and executes mode switching. When the switching from the video signal transmission mode M1 to the data signal transmission exclusive mode M2 has been completed by this mode switching, the transmission-side control system 11A transmits notification thereof to the reception-side control system 21A (process S6). The reception-side control system 21A notifies the control device 40 that switching to the data signal transmission exclusive mode M2 has been completed (process S7).

On receipt of notification that switching to the data signal transmission exclusive mode M2 has been completed, the control device 40 next transmits, to the reception-side control system 21A, a control signal related to setting stop of the image sensor 15 and setting writing to the data storage device 30 (process S8). On receipt of this control signal, the reception-side control system 21A transmits the received control signal to the transmission-side control system 11A (corresponding to the third data transmission DT3) (process S9) and also replies with a receipt notification to the control device 40.

Based on the received control signal, the transmission-side control system 11A stops the image sensor 15 and also performs preparation for writing to the data storage device 30, and when both these actions are complete, notifies the reception-side control system 21A thereof (process S10). The control device 40 here uses the receipt notification acquired when process S8 was executed as a trigger for execution of a writing action to write the data signal DS configuring part of the firmware update data of the data storage device 30 (corresponding to the second data transmission DT2) to the reception-side buffer 27 (process S11). This writing is executed on the first reception-side buffer of the reception-side buffer 27. Note that although an example has been given in which action by the control device 40 is executed with a receipt notification acting as a trigger, however instead of performing receipt notification, status information of the reception-side control system 21A stored in the reception-side register 28 may be monitored by the control device 40 so as to identify the execution timing of the next action.

On receipt of notification that that stopping of the image sensor 15 and preparation for writing to the data storage device 30 has been completed by the transmission-side control system 11A at process S10, the reception-side control system 21A notifies the control device 40 thereof (process S12). On receipt of this notification, the control device 40 requests the reception-side control system 21A to start transmission to the transmission-side control system 11A of the data signal DS that was written previously at process S11 to the first reception-side buffer (process S13). The transmission system 1A according to the present modified example is thereby able to shorten the time needed for each data transmission due to executing the process S11 including the second data transmission DT2 in parallel to the process S9 and the process S10 including the third data transmission DT3.

On receipt of the request to start transmission of the data signal DS, the reception-side control system 21A starts transmission to the transmission-side control system 11A of the data signal DS written to the first reception-side buffer (process S14). When doing so the transmission mode is set to the data signal transmission exclusive mode M2, and so the data signal DS being transmitted is transmitted continuously. In addition, the control device 40 employs the receipt notification acquired when process S13 was executed as a trigger to execute a writing action (corresponding to the second data transmission DT2) to the reception-side buffer 27 of the data signal DS configuring part of the firmware update data of the data storage device 30 (process S15). This writing is executed to a buffer from out of the reception-side buffer 27 on the side where the reading action of process S14 was not performed, namely to the second reception-side buffer.

The data signal DS transmitted to the transmission-side control system 11A at process S14 is temporarily stored in the transmission-side buffer 16. The storage destination of the data signal DS at this stage may be the first transmission-side buffer from out of the transmission-side buffer 16. When the data signal DS storing in the first transmission-side buffer has been completed, the transmission-side control system 11A notifies the completion to the reception-side control system 21A (process S16). Moreover in parallel to this process S16, the data signal DS stored in the first transmission-side buffer is sent to the data storage device 30 and a reading action (corresponding to the first data transmission DT1) is executed (process S17). In such cases, all three of the first data transmission DT1, the second data transmission DT2, and the third data transmission DT3 may be executed in parallel. The data transmissions each have different configuration elements utilized in each process, and so this enables execution thereof without affecting each other.

On receipt of notification that storing of the data signal DS in the first transmission-side buffer has been completed by the transmission-side control system 11A at process S16, the reception-side control system 21A notifies the control device 40 thereof (process S18). On receipt of this notification, the control device 40 transmits a request to the reception-side control system 21A requesting transmission to be started to the transmission-side control system 11A of the data signal DS that was written previously to the second reception-side buffer at the process S15 (process S19). In this case too, the transmission system 1A according to the present modified example executes the process S15 containing the second data transmission DT2, the process S14 and the process S16 including the third data transmission DT3, and the process S17 including the first data transmission DT1, by execution in parallel to each other, and so the is no substantial need to wait for completion of the writing action to the second reception-side buffer.

On receipt of the request to start transmission of the data signal DS as described above, the reception-side control system 21A starts transmission of the data signal DS that was written to the second reception-side buffer to the transmission-side control system 11A (process S20). In addition, the control device 40 employs receipt notification acquired when process S19 was executed as a trigger to execute a writing action to write the data signal DS configuring part of the firmware update data of the data storage device 30 (corresponding to the second data transmission DT2) to the reception-side buffer 27 (process S21). This writing is executed to the buffer out of the reception-side buffer 27 on the side where the reading action was not performed in process S20, namely to the first reception-side buffer. Also in the case described above, since each of the data transmissions may be executed in parallel, and more specifically are based on the content described above, description from there onwards is omitted.

The data signal DS transmitted to the transmission-side control system 11A at process S20 is temporarily stored in the transmission-side buffer 16. The storage destination of the data signal DS when this is performed may be the second transmission-side buffer from out of the transmission-side buffer 16. When storage of the data signal DS in the second transmission-side buffer has been completed, the transmission-side control system 11A notifies the reception-side control system 21A thereof (process S22). Moreover, in parallel to the process S22, a reading action (corresponding to the first data transmission DT1) of the data signal DS stored in the second transmission-side buffer and transmitted to the data storage device 30 is performed (process S23).

After the process S23 has been performed, the above process S12 to process S23 may be repeatedly executed until completion of transmission of the data needed to update the firmware. Then when the control device 40 has received notification that transmission of the data needed to update the firmware has been completed, a control signal to the reception-side control system 21A to switch from the data signal transmission exclusive mode M2 to the video signal transmission mode M1 is transmitted from the control device 40 (process S24). The reception-side control system 21A transmits this control signal to the transmission-side control system 11A (process S25).

On receipt of the control signal from the reception-side control system 21A to switch to the video signal transmission mode M1, the transmission-side control system 11A transmits this control signal to the transmission-side main control section 12 through the transmission-side register 17, and performs mode switching. When the switching from the data signal transmission exclusive mode M2 to the video signal transmission mode M1 has been completed by this mode switching, the transmission-side control system 11A transmits notification of completion thereof to the reception-side control system 21A (process S26). Finally, the reception-side control system 21A notifies the control device 40 that switching to the video signal transmission mode M1 has been completed (process S27), and the cycle of processes is ended.

As described above, by employing the transmission-side buffer 16 and the reception-side buffer 27, as in the configuration adopted in the transmission system 1A according to the present modified example, the first data transmission DT1, the second data transmission DT2, and the third data transmission DT3 can be performed in parallel to each other. The first data transmission DTI to the third data transmission DT3 as described above do not have configuration elements used in these processes that overlap with each other, and so each accordingly does not affect the other data transmissions. In the transmission system 1A according to the present modified example configured as described above, the time needed for data transmission can be greatly shorted even in cases in which there is a need for large volume data transmission.

The present disclosure is not limited by the exemplary embodiments described above, and various modifications may be implemented within a range not departing from the spirit of the present disclosure. All such modifications are contained in the technical scope of the present disclosure. Moreover in the present disclosure, unless an inconsistency arises therefrom, each of the configuration elements may be present as a single configuration element or as two or more thereof.

What is claimed is:

1. A transmission system including a transmission device capable of transmitting a video signal, and a reception device capable of receiving the video signal transmitted by the transmission device, the transmission system comprising:

a memory;

a processor connected to the memory;

a video transmission circuit and a video reception circuit that transmit the video signal between the transmission device and the reception device;

a transmission-side data transceiving circuit and a reception-side data transceiving circuit configured to transmit and receive a data signal that is different from the video signal between the transmission device and the reception device;

a data storage device communicably connected to the transmission device; and a control device communicably connected to the reception device, wherein transmission of the data signal between the transmission device and the data storage device, transmission of the data signal between the reception device and the control device, and transmission of the data signal between the transmission device and the reception circuit, are executable in parallel to each other, and wherein the processor is configured to selectively execute a video signal transmission mode in which transmission of the video signal is performed and transmission of the data signal superimposed on the video signal is performed, and a data signal transmission exclusive mode in which transmission of the video signal is stopped and transmission of the data signal is performed.

2. The transmission system of claim 1, wherein data transmission in the data signal transmission exclusive mode includes transmission of a synchronization signal from the transmission device to the reception device.

* * * * *